United States Patent Office 3,505,240
Patented Apr. 7, 1970

3,505,240
PHOSPHORS AND THEIR PREPARATION
Thomas L. Barry, Beverly, Mass., assignor to Sylvania Electric Products Inc., a corporation of Delaware
No Drawing. Filed Dec. 30, 1966, Ser. No. 606,002
Int. Cl. C09k 1/54; H01j 61/44, 61/20
U.S. Cl. 252—301.4                                   5 Claims

ABSTRACT OF THE DISCLOSURE

A fluorescent phosphor excitable by both 2537 and 3650 A. radiation is prepared which has a composition characterized as $(Ba_{2-x}Sr_x)SiO_4:Eu^{+2}{}_{0.0005\ to\ 0.05}$ where $x$ is no more than two. The phosphor is prepared by mixing barium and strontium carbonates with a source of $SiO_2$ and europium. An ammonium chloride flux is blended into the mix and the batch is fired to produce the phosphor.

BACKGROUND OF THE INVENTION

Field of the invention

This invention relates to fluorescent phosphors and their preparation. More particularly, the invention concerns the preparation of barium-strontium orthosilicate crystalline solutions activated by divalent europium.

DESCRIPTION OF THE PRIOR ART

Fluorescent phosphors are known to the art and procedures have previously been devised for their preparation. In general, phosphors are utilized in electric discharge lamps wherein they are coated on the bulb wall. When mercury contained within the lamp is ionized, it emits its characteristic radiation with principal energy lines at 2537 and 3650 A.

Irradiation of the phosphor with these mercury-lines produces light emission. If the phosphor is excited by 2537 A. irradiation and does not respond appreciably to 3650 A., the 3650 A. line tends to pass directly through the bulb wall. With lamps that are housed in a plastic fixture, the 3650 A. irradiation tends to depolymerize the plastic and causes darkening.

SUMMARY OF THE INVENTION

According to my invention, I have discovered a fluorescent phosphor which is efficiently excited by both 3650 and 2537 A. radiation and hence will absorb irradiation from both of the lines. The energy is then converted to visible light which is not detrimental to the plastic fixtures.

The phosphor can be characterized according to the formula: $(Ba_{2-x}Sr_x)SiO_4:Eu_{0.0005\ to\ 0.05}$ where $x$ is between 0 and 2. Depending upon the value of $x$, the emission can be shifted from green to yellow. To prepare the phosphor, 0 to 2 moles of $SrCO_3$ and 0 to 2 moles of $BaCO_3$ are mixed with 1 mole of silicic acid and 0.0005 to 0.05 mole of europium atoms, preferably europium sesquioxide. Included in the mixture is a chloride flux, preferably ammonium chloride. The mixture is fired at temperatures of 900 to 1400° C., preferably 1200° C., in a neutral or reducing atmosphere. When fired, the material is thoroughly washed in water, preferably hot, and dried. In the case of crystalline solutions containing more than 75 mole percent $Ba_2SiO_4$ care must be exercised as hydration can occur upon prolonged washing.

DESCRIPTION OF THE PREFERRED EMBODIMENTS

The data concerning the fluorescent properties of the $(Ba_{2-x}Sr_x)SiO_4:Eu^{+2}$ phosphor system as prepared according to the present invention is shown in the following table

TABLE I

| Mole percent | | | | Int. factor (arbitrary units) |
|---|---|---|---|---|
| $Ba_2SiO_4$ | $Sr_2SiO_4$ | λ Peak (nm.) | $W_{h/2}$ (nm.) | |
| 100 | 0 | 505 | 60 | 74.9 |
| 90 | 10 | 510 | 63 | 71.1 |
| 80 | 20 | 515 | 67 | 70.4 |
| 70 | 30 | 519 | 68 | 80.0 |
| 60 | 40 | 521 | 70 | 73.9 |
| 50 | 50 | 524 | 72 | 68.3 |
| 40 | 60 | 531 | 84 | 67.5 |
| 30 | 70 | 543 | 93 | 63.6 |
| 20 | 80 | 556 | 102 | 61.2 |
| 10 | 90 | 568 | 106 | 62.3 |
| 0 | 100 | 575 | 106 | 61.7 |

In the table, $W_{h/2}$ is the width of a given emission peak at half height in nanometers. The intensity factor is the product of the peak height in relative energy units and the width at half height. As seen, when increasing quantities of $Sr_2SiO_4$ are taken into the solid solution, while the total mole percent of $Ba_2SiO_4$ and $Sr_3SiO_4$ is maintained at 100 percent, the peak emission is shifted from 505 nm. to 575 nm. Thus the emission can be shifted from a green to a yellow color depending upon the ratio of $Sr_2SiO_4$ and $Ba_2SiO_4$ which is selected.

In the present process, I have discovered quite unexpectedly that chloride ion flux, preferably ammonium chloride must be added to the blend of starting materials to obtain a phosphor efficient under 2537 A. excitation. Without the ammonium chloride, the reaction product includes unreacted materials characteristic of nonequilibrium conditions. But when the ammonium chloride is added, a product with a deep body color (similar to its characteristic emission) is produced and when the phosphor after washing is placed in lamps, maintenance and initial brightness are improved.

Table II compares the phosphors of my invention with one conventionally used as a green emitting material.

TABLE II

| Phosphor | Hrs. | | | |
|---|---|---|---|---|
| | 0 | 100 | 489 | 1763 |
| $SrBaSiO_4:Eu_{.01}$ (lumens) | 3,207 | 3,214 | 3,168 | 3,174 |
| $Mg_{0.75}Ga_2O_4:Mn_{.01}$ (control) (lumens) | 2,238 | 2,167 | 2,121 | 2,083 |

As seen, the brightness of the phosphor of the present invention is materially brighter at each stage of testing and a maintenance of about 98% is realized. In the control, the maintenance is about 78% at the last test.

To prepare the phosphor, for every mole of $SiO_2$, usually usually added as silicic acid, 0 to 2 moles of $SrCO_3$ and 0 to 2 moles of $BaCO_3$ are mixed, sum of the number of moles of $BaCO_3$ and $SrCO_3$ being two. For every mole of $SiO_2$, 0.01 to 0.5 gram atoms of Cl are admixed, preferably as $NH_4Cl$. The starting materials are blended and then fired at a temperature of 900 to 1400° C. in a neutral or preferably reducing atmosphere. When fired, the product is thoroughly washed in water, preferably hot, to remove any remaining chloride flux.

The following specific examples are included to illustrate the invention, but are not intended to be limitations upon the claims.

EXAMPLE I

Weigh out and blend:

| | Gms. |
|---|---|
| $SrCO_3$ | 17.716 |
| $H_2SiO_3$ | 4.686 |
| $NH_4Cl$ | .321 |
| $Eu(NO_3)_3 \cdot 6H_2O$ | .535 |

Fire at 1200° C. for four hours in an 80% $N_2$-20% hydrogen atmosphere and cool in the same atmosphere.

After thorough washing in hot water a $Sr_2SiO_4:Eu^{+2}$ phosphor was produced which had a yellow emission peaking at 575 nm.

EXAMPLE II

Weigh out and blend:

| | Gms. |
|---|---|
| $BaCO_3$ | 23.684 |
| $H_2SiO_3$ | 4.686 |
| $NH_4Cl$ | .321 |
| $Eu(NO_3)_3 \cdot 2H_2O$ | .535 |

The firing procedures described in Example I were produced and a green emitting, $Ba_2SiO_4:Eu^{+2}$ phosphor was produced which peaked at 550 nm.

EXAMPLE III

Weigh out and blend:

| | Gms. |
|---|---|
| $SrCO_2$ | 12.400 |
| $BaCO_3$ | 7.104 |
| $H_2SiO_3$ | 4.686 |
| $NH_4Cl$ | .321 |
| $Eu(NO_3)_3 \cdot 6H_2O$ | .535 |

A yellow-green phosphor peaking at 543 nm. and having a composition of $(Ba_{0.6}Sr_{1.40})SiO_4:Eu^{+2}$ is produced when the firing procedure of Example I is followed.

EXAMPLE IV

Weigh out and blend:

| | Gms. |
|---|---|
| $SrCO_3$ | 8.858 |
| $BaCO_3$ | 11.840 |
| $H_2SiO_3$ | 4.686 |
| $NH_4Cl$ | 0.321 |
| $Eu(NO_3)_3 \cdot 6H_2O$ | 0.535 |

A yellow-green phosphor peaking at 524 nm. and having a composition of $Sr_{1.00}Ba_{1.00}SiO_4:Eu^{+2}$ is produced when the firing procedure of Example I is followed.

EXAMPLE V

Weigh out and blend:

| | Gms. |
|---|---|
| $SrCO_3$ | 5.314 |
| $BaCO_3$ | 16.578 |
| $H_2SiO_3$ | 4.686 |
| $NH_4Cl$ | 0.321 |
| $Eu(NO_3)_3 \cdot 6H_2O$ | 0.535 |

A yellow-green phosphor peaking at 519 nm. and having a composition of $(Sr_{0.60}Ba_{1.40})SiO_4:Eu^{+2}$ is produced when the process of Example I is followed.

As my invention, I claim:

1. A process for preparing a phosphor which is excitable by radiation at both 2537 and 3650 A., the steps which comprise: mixing a source of $SiO_2$ with 0 to 2 moles of barium carbonate and 0 to 2 moles of strontium carbonate per mole of $SiO_2$, the sum of the alkaline earth carbonates being about 2 moles mixing also sufficient europium atoms to activate the phosphor upon firing together with about 0.01 to 0.5 mole of ammonium chloride per mole of $SiO_2$ as a flux; said phosphor containing either strontium atoms or barium atoms or both strontium and barium atoms as the cation; firing the mixture in a neutral or reducing atmosphere at a temperature between about 900 and 1400° C. to produce the phosphor and then washing the phosphor to remove the chloride flux.

2. The process according to claim 1 wherein the europium is europium sesquioxide.

3. The process according to claim 1 wherein after firing, the phosphor is cooled in a reducing or neutral atmosphere.

4. The process according to claim 1 wherein the wash water is hot.

5. The process according to claim 1 wherein the europium concentration is between 0.0005 to 0.05 mole of europium per mole of $SiO_2$.

References Cited

UNITED STATES PATENTS

| | | |
|---|---|---|
| 2,297,108 | 9/1942 | McKeag et al. |
| 2,440,048 | 4/1948 | Hood. |
| 2,966,463 | 12/1960 | Shaffer et al. |
| 3,014,876 | 12/1961 | Mooney. |
| 3,043,781 | 7/1962 | Mooney et al. |
| 3,063,946 | 11/1962 | Mooney. |

HELEN M. McCARTHY, Primary Examiner

R. D. EDMONDS, Assistant Examiner

U.S. Cl. X.R.

106—63